(12) United States Patent
Debbouz et al.

(10) Patent No.: US 6,428,835 B1
(45) Date of Patent: Aug. 6, 2002

(54) SHELF-STABLE FILLED PASTA AND METHODS OF MAKING

(75) Inventors: Amar Debbouz; Edward Albert Matuszak, both of Columbus, OH (US)

(73) Assignee: Kraft Foods North America Inc., Northfield, IL (US)

( * ) Notice: Subject to any disclaimer, the term of this patent is extended or adjusted under 35 U.S.C. 154(b) by 0 days.

(21) Appl. No.: 09/767,905

(22) Filed: Jan. 24, 2001

(51) Int. Cl.[7] .................................................. A23L 1/16
(52) U.S. Cl. ....................... 426/557; 426/94; 426/237; 426/241; 426/283; 426/451
(58) Field of Search .................................. 426/451, 557, 426/94, 241, 321, 324, 283, 237

(56) References Cited

U.S. PATENT DOCUMENTS

| | | | | |
|---|---|---|---|---|
| 4,898,744 A | * | 2/1990 | Liggett et al. | 426/557 |
| 5,059,433 A | * | 10/1991 | Lee et al. | 426/557 |
| 5,695,801 A | * | 12/1997 | Oh | 426/557 |
| 5,922,381 A | * | 7/1999 | Bajracharya et al. | 426/557 |
| 5,972,397 A | * | 10/1999 | Durance et al. | 426/242 |

* cited by examiner

*Primary Examiner*—Lien Tran
(74) *Attorney, Agent, or Firm*—Stevens, Davis, Miller & Mosher, L.L.P.

(57) ABSTRACT

A shelf-stable filled pasta and a method of making same, the method comprising providing an acid-treated or acid-containing fillable pasta piece having a pH of about 4.6 or less; inserting filling into the fillable pasta piece; exposing the filling in the filled pasta piece to microwave or radio frequency radiation to reduce the water activity in the filling to about 0.85 or less; sealing the filled pasta piece in a package; and pasteurizing the filled pasta piece at any point in the process after the filling has been inserted into the fillable pasta piece. The shelf-stable filled pasta is a pasta made by the foregoing method.

14 Claims, No Drawings

SHELF-STABLE FILLED PASTA AND METHODS OF MAKING

BACKGROUND OF THE INVENTION

1. Field of the Invention

This invention relates to shelf-stable filled pasta and methods of manufacturing same. More particularly, the invention relates to partially or fully cooked filled pasta of intermediate moisture in which the pasta shell is rendered shelf-stable by incorporation of or treatment with edible acids and the filling is rendered shelf-stable by means of water activity depressants and microwave or radio frequency treatment.

2. Description of Related Art

Many partially and fully cooked packaged pastas are disclosed in the prior art. Prior methods for rendering them storable include canning, complete or partial drying, freezing or refrigeration, and acidification. These methods, however, produce filled pasta with sensory attributes that are significantly different from freshly made filled pasta.

Fully cooked canned pasta, which generally has more than 38 percent moisture, tends to be soggy and mushy because the moisture difference between the core and surface portion of the pasta is lost. When pasta is first made, the core is less moist than the surface of the pasta. This moisture difference is responsible for the desired "al dente" texture. Within hours, however, the moisture difference disappears and the pasta becomes soggy and mushy.

Some workers in the field have resorted to drying the pasta to increase shelf stability. The drying process, however, normally requires careful control of temperature and humidity, takes a considerable amount of space, and must be done very slowly (6–18 hours). If hastened, a hard "skin" forms over the surface of the individual pasta pieces, and this skin cracks during subsequent drying. The result is pasta that is fragile and, when prepared for consumption in boiling water, falls apart. Drying can also result in microbiological contamination because the moist warm atmosphere of the dryers encourages microbiological growth. Furthermore, while the bacteria themselves may be rendered harmless by the heat during the final stages of drying, heat stable toxins are often produced that cannot be easily rendered harmless. Finally, dried pasta must be re-hydrated by immersing it in boiling water or steam. This takes a relatively long time and exacerbates the flavor loss already occasioned by the extended drying in filled dried pasta, often the filling does not rehydrate fully and uniformly during cooking.

Others have attempted to reduce the water activity in pasta by adding water activity depressants such as sugars, salts, glycerol, propylene glycol and the like. Adding large amounts of water activity depressants, however, can harm the flavor and texture of the pasta, especially the shell portion of the filled pasta and especially if water depressants are the only means used to obtain pasta that need not be refrigerated or frozen.

Others have attempted to increase shelf stability by adding edible acids to the filling and shell portion pasta to obtain a pH of around 4.6. These bacteria-killing acids, however, result in an unpleasant acid taste, especially when the filling is acidified. As U.S. Pat. No. 5,922,381 to Nestec states, "in the case of filled pasta products such as ravioli and tortellini, most fillings accentuate the acidic note and the products become almost inedible at pH lower than 4.6." To counter the acidic note, others have added basic compounds to sauces in separate packages to neutralize the acids just before eating. In the case of filled pastas, however, the sauce fails to reach the filling, neutralizing only the acid near the exterior of the pasta shell.

It can be appreciated from examining the prior art that there exists a continuing need for a new and improved fully or partially cooked shelf-stable filled pasta that needs no refrigeration or freezing to prolong shelf stability, and methods of making the same. In this regard, the present invention substantially fulfills this need. As used hereafter, "shelf-stable" is intended to mean stable at ambient (room temperature) conditions in the absence of refrigeration and/or freezing.

SUMMARY OF THE INVENTION

The inventive method of making shelf-stable filled pasta comprises providing an acid-treated or acid-containing fillable pasta piece having an equilibrium pH of about 4.6 or less; inserting filling into the fillable pasta piece to form a filled pasta piece; exposing the filling in the filled pasta piece to microwave or radio frequency radiation to reduce the water activity ($A_w$) in the filling to about 0.85 or less; sealing the filled pasta piece in a package; and pasteurizing the filled pasta piece at least once at any point in the process after the filling has been inserted into the fillable pasta piece.

Preferred embodiments of the inventive method include some or all of the following features: the fillable pasta piece is formed by first laminating uncooked pasta dough; the filled pasta piece is pasteurized with steam before being exposed to microwave or radio frequency radiation; the sealing entails flushing the package with a gas that contains nitrogen and substantially lacks oxygen; an additional pasteurizing step may occur after the sealing step; the filled pasta piece is a tortellini or a ravioli; and/or the acid-treated, fillable pasta piece is treated with or contains an edible acid, especially those selected from the group consisting of citric acid, lactic acid, fumaric acid, tartaric acid, malic acid and glucono delta lactone.

The inventive shelf-stable filled pasta comprises a pasta produced by the foregoing method. Preferred embodiments of the inventive shelf-stable filled pasta comprise a pasta produced by methods having some or all of the foregoing preferred features.

DESCRIPTION OF THE PREFERRED EMBODIMENTS

Typically, in filled pasta both the dough and filling need to be acidified if their water activities are higher than 0.85. Acidification of both the dough and the filling, however, produces unacceptable sensory attributes due to a strong acidic taste. Most of the acidic taste is contributed by the acid in the filling. To eliminate the acidification of the filling while retaining shelf stability, I have found that it is necessary to reduce the filling's water activity to 0.85 or lower.

In a preferred embodiment, the shelf-stable pasta is made by first providing pasta ingredients. Any suitable material from wheat can be used to make the pasta, such as semolina, farina and flours derived from hard or soft wheat, durum wheat and the like. Other flours can also be used, such as those derived from rice, buckwheat and similar grain sources. Other ingredients such as flavorants, colorants and texture improving substances such as egg albumen, alginates, gums and cellulose derivatives may be added to the flour.

To reduce microbial load, the water used in the pasta is preferably purified by deionization or reverse osmosis water treatment systems, followed by UV light exposure. The optimum amount of water depends on the type of flour used and can be determined by one skilled in the art.

Edible food acids that are generally recognized as safe (GRAS) are then added to either the water or the ingredients. Preferably, the acids are added to the water before mixture with the ingredients. (Alternatively, the formed pasta dough could be immersed in the acids.) The pH of the acids ranges from about 1.5 to about 3.5 depending on their concentrations.

Next, the ingredients are mixed with the acidified water to obtain dough ranging in moisture between 29 percent and 36 percent and having an equilibrium pH of about 3.8 to 4.6, preferably about 4.6. The dough is sheeted, i.e., laminated three times by passing it through sheeting rolls to obtain the desired dough thickness. Alternatively, the dough may be shaped by extrusion. Fillable pasta, such as Tortellini or ravioli pieces, are then formed and filled with the filling.

The filling is prepared by mixing the filling base (meat, cheese, vegetable seafood or other fillings) with flavoring ingredients and seasonings, and water activity depressants such as salts, sugars, gums, alcohol, alginates and humectants such as glycerol or propylene glycol. Preservatives may also be added to inhibit the growth of yeast and mold. (Yeast and molds grow at much lower water activity levels than microbes.)

The filled pasta pieces are then pasteurized, preferably with superheated steam, to set the pasta shell surface in order to maintain structural integrity during subsequent processing. Steam treatment typically occurs in a food grade steamer at atmospheric pressure for about 0.5 to about 6.0 minutes.

The filling within the pasta pieces is then exposed to microwave or radio frequency waves to reduce the water activity of the preferably non-acidified filling to 0.85 or lower, more preferably to about 0.50 to 0.85, most preferably to about 0.80 to 0.85. Water activity is the measure of the unbound free water available to support biological and chemical reactions. Low values of water activity are known to reduce the growth of microorganisms. One measure of water activity is $A_w=P/P_o$, where P is the vapor pressure of water in the food item and $P_o$ is the vapor pressure of pure water at the same temperature. Lowering $A_w$ restricts the growth of bacteria and is accomplished by lowering P, the vapor pressure of water in the food item. P may be depressed by adding solutes to the food item. Most bacteria of concern require $A_w$ values of 0.90 or greater to grow.

Exposing the pasta to radiation drives water out of the filling, thereby increasing the filling's solute to water ratio. It is significant that this step entails an initial inside-to-outside movement of water, whereas conventional drying first removes water from the outside of the pasta shell and then, eventually, from the filling inside the shell. Conventional drying hardens the pasta shell, preventing rapid moisture removal from the filling. Thus, with conventional drying, prolonged drying time is needed to remove the desired amount of water from the filling, and this longer drying time causes excessive drying of the shell while the filling moisture remains high. If the radiation treatment is very short, preferably 5 to 150 seconds, more preferably 15 to 70 seconds, it flushes some moisture out of the filling without changing the state of the enveloping dough from the rubber viscoelastic state that characterizes freshly made pasta. Indeed, microwave treatment of only 15 to 70 seconds with a 50 kw batch microwave generator has the effect of moistening the exterior of the pasta shell because moisture that escapes from the inner filling is deposited there. (Preferably, the moisture content of the final pasta shell is around 22 percent.) 50 kw batch microwave generators of the type available from Microdry Inc. and radio frequency generators of the type used by Radio Frequency Company Inc. are preferred.

After exposure to radiation, the filled pasta pieces are preferably sealed in modified atmosphere packaging by pulling vacuum and flushing with nitrogen ($N_2$) or a gas mixture of carbon dioxide ($CO_2$) and nitrogen ($N_2$). Packaging under partial vacuum is preferred because removing excess air improves shelf stability by minimizing oxidative flavor changes. The package can be any food grade, high temperature stable packaging system having good gas and moisture barrier properties. Suitable packages include pouches made of a multi-layered film having a liner of low density polyethylene, a layer of standard polyethylene and a polypropylene sealant.

Finally, the sealed pasta pieces may be pasteurized by, for example, boil-in-bag processing, steaming or microwave pasteurization. In any event, it is essential that the filling in the center of the pasta reach the minimum pasteurization temperature. The temperature at the coldest spot should be in the range of from about 80° C. to 110° C. for about 5 to 60 minutes, and preferably from about 95° C. to 100° C. for about 10 to 20 minutes. Pasteurization of the filled pasta pieces may be completed before packaging, especially insofar as the purpose of the heat treatment of the packaged filled pasta is to render the package itself non-microbial.

The surface appearance and consistency of the radiation-treated filled pasta are very similar to that of freshly produced filled pasta. It does not require refrigeration or freezing, cooks in short time, and has an extended shelf life on the order of nine months.

In other embodiments, an uncooked or partially cooked moist pasta dough is extruded and treated with steam. The dough is then immersed in an aqueous solution containing edible acids (GRAS) to reduce the pH to levels that inhibit microbial growth. The solution may also contain water activity depressants. The immersion time will vary with the thickness of the pasta and the concentration of the acid or water depressant. Sufficient immersion times generally range from about 1 minute to about 4 minutes. Following the immersion step, the pasta is partially surface dried to improve handling properties during subsequent processing.

It should be understood that the foregoing summary and detailed description of the invention are not intended to be limiting, but are only exemplary of the inventive features that are defined in the claims.

We claim:

1. A method of manufacturing filled pasta capable of storage without refrigeration or freezing, comprising the steps of:
    a) providing a fillable pasta piece having a pH of about 4.6 or less;
    b) inserting a filling into said fillable pasta piece to form a filled pasta piece;
    c) exposing the filling in said filled pasta piece to microwave or radio frequency radiation to reduce the water activity of the filling to about 0.85 or less;
    d) sealing said filled pasta piece in a package; and
    e) pasteurizing said filled pasta piece at any point after said inserting a filling step.

2. The method of claim 1, wherein said filling includes a water activity depressant.

3. The method of claim 2, wherein said water activity depressant is selected from the group consisting of sugars, salts, gums, alcohol, alginates and humectants.

4. The method of claim 1, wherein the water activity is reduced to 0.80 to 0.85.

5. The method of claim 1, wherein said exposure to microwave or radio frequency radiation lasts from 15 to 70 seconds.

6. The method of claim 1, wherein the filled pasta piece has a shelf life of at least nine months.

7. The method of claim 1, wherein said fillable pasta piece is formed by first laminating uncooked pasta dough.

8. The method of claim 1, wherein said filled pasta piece is pasteurized with steam before being exposed to microwave or radio frequency radiation.

9. The method of claim 1, further comprising an additional pasteurizing step after said sealing.

10. The method of claim 1, wherein said sealing comprises flushing said package with a gas containing nitrogen and substantially lacking oxygen.

11. The method of claim 1, wherein said pH of said fillable pasta piece is reached by addition of an edible acid.

12. The method of claim 11, wherein said edible acid is selected from the group consisting of citric acid, lactic acid, fumaric acid, tartaric acid, malic acid and glucono delta lactone.

13. The method of claim 1, wherein said pH of said fillable pasta piece is reached by immersion in a solution containing an edible acid.

14. The method of claim 13, wherein said edible acid is selected from the group consisting of citric acid, lactic acid, fumaric acid, tartaric acid, malic acid and glucono delta lactone.

* * * * *